(12) United States Patent
Hoshino et al.

(10) Patent No.: US 9,753,456 B2
(45) Date of Patent: Sep. 5, 2017

(54) DEVICE FOR DETECTING DECREASE IN ROTATIONAL SPEED OF COOLING FAN OF MACHINE TOOL

(71) Applicant: FANUC Corporation, Yamanashi (JP)

(72) Inventors: Yoshinori Hoshino, Yamanashi (JP); Taisei Fujimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/012,187

(22) Filed: Feb. 1, 2016

(65) Prior Publication Data
US 2016/0223576 A1 Aug. 4, 2016

(30) Foreign Application Priority Data
Feb. 2, 2015 (JP) ................. 2015-018582

(51) Int. Cl.
B23Q 11/00 (2006.01)
G05B 23/02 (2006.01)
B23Q 11/12 (2006.01)

(52) U.S. Cl.
CPC ........ G05B 23/0289 (2013.01); B23Q 11/126 (2013.01)

(58) Field of Classification Search
CPC .............................. G01P 3/44; G05B 23/0289
USPC .......................................... 340/664; 324/177
See application file for complete search history.

(56) References Cited

U.S. PATENT DOCUMENTS

| 6,262,549 B1* | 7/2001 | Yang ..................... G01P 3/481 318/463 |
| 6,407,672 B1* | 6/2002 | Grenz .................... G06F 1/206 340/507 |
| 2005/0030171 A1* | 2/2005 | Liu ........................ G06F 1/206 340/500 |
| 2008/0030141 A1* | 2/2008 | Wang ..................... F21V 29/67 315/117 |
| 2008/0243436 A1* | 10/2008 | Tsutsui ................... G06F 1/203 702/182 |
| 2011/0095716 A1* | 4/2011 | Hanyu ................ H02P 29/0044 318/473 |

FOREIGN PATENT DOCUMENTS

| JP | H03-169209 A | 7/1991 |
| JP | 2004-328828 A | 11/2004 |

OTHER PUBLICATIONS

Office Action in JP Application No: 2015-018582, dated Apr. 25, 2017.

* cited by examiner

*Primary Examiner* — Qutbuddin Ghulamali
(74) *Attorney, Agent, or Firm* — Hauptman Ham, LLP

(57) ABSTRACT

A machine tool including a cooling fan measures an input power source voltage to the machine tool and an input current to the cooling fan. If the measured current value is outside a predetermined current value range corresponding to the measured voltage value, the machine determines that the rotational speed of the cooling fan has decreased.

10 Claims, 3 Drawing Sheets

DEVICE FOR DETECTING DECREASE IN ROTATIONAL SPEED OF COOLING FAN OF MACHINE TOOL

RELATED APPLICATIONS

The present application claims priority to Japanese Application Number 2015-018582, filed Feb. 2, 2015, the disclosure of which is hereby incorporated by reference herein in its entirety.

BACKGROUND OF THE INVENTION

1. Field of the Invention

The present invention relates to a device that detects reduction in the rotational speed of a cooling fan of a machine tool.

2. Description of the Related Art

A fan is widely used as a unit to cool a heat generating portion, such as a motor and a control panel, during an operation of a machine tool. Overheating causes malfunction of a machine tool. Thus, a fan is desired to keep cooling without stopping to reduce downtime and for preventive maintenance.

Stopping modes of a fan are roughly categorized into part malfunction, such as a break of a fan motor coil and an earth fault, and mechanical restriction, such as tangling of a foreign object on a fan blade. Binding of a fan by sludge, which is a mode of the mechanical restriction, happens most frequently. When a rotating fan suctions the atmosphere including oil mist and powder dust surrounding a machine tool, oil mist and powder dust adhere on the fan in a form of sludge and hinder the rotation of the fan. As the sludge gradually grows, the fan reduces its rotational speed and eventually stops by binding.

Oil mist and powder dust contamination is also the most frequent cause of the stopping mode of the part malfunction. In many cases, the sludge is likely to cause reduction in the rotational speed before malfunction occurs. For a fan motor that is a three-phase motor, an earth fault or a break of wire happening in only one phase causes reduction in the rotational speed but the fan keeps on rotating. As contamination grows, malfunction occurs at a plurality of sections, and eventually the fan stops.

As described above, reduction in the rotational speed occurs before the fan stops. By detecting in advance the reduction in the rotational speed, stop of the fan can be prevented.

To detect the reduction in the rotational speed of the fan, an encoder that detects the rotational speed may be attached to the fan. However, an encoder is expensive compared to a fan. Moreover, the encoder is required to be attached near the fan where oil mist and powder dust suctioned by the fan accumulate, so the encoder is likely to go wrong.

Regarding this problem, Japanese Patent Application Laid-Open No. 03-169209 discloses a method for detecting the rotational speed of a fan of a controller including a fan motor by monitoring a consumption current. With this technique, the reduction in the rotational speed is detected by monitoring the increase in the consumption current as sludge hinders the rotation of the fan to require a larger torque to rotate the fan. A current measuring device is inexpensive and need not be attached near the fan. Thus, the problem related to the detection of the reduction in the rotational speed by an encoder can be solved. Furthermore, an earth fault and a break of wire can also be detected by monitoring the current.

However, the consumption current of the fan fluctuates with the change in a power source voltage. The fluctuation is not likely to occur when power is supplied to the fan from a power source circuit inside a machine tool as in the technique disclosed in Japanese Patent Application Laid-Open No. 03-169209. However, when power is directly supplied to the fan from a commercial power source, of which voltage tends to fluctuate, whether the change in the consumption current is caused by the reduction in the rotational speed or the fluctuation in the power source voltage cannot be distinguished.

SUMMARY OF THE INVENTION

An object of the present invention is to provide a machine tool that can detect the reduction in the rotational speed of a cooling fan even under fluctuation of a power source voltage applied to the cooling fan.

A first embodiment of a machine tool according to the present invention includes a cooling fan, a user interface unit configured to give a notice of a state of the machine tool, a current measuring unit configured to measure an input current to the cooling fan, a voltage measuring unit configured to measure an input power source voltage to the machine tool, a first storage unit storing a threshold of the input current corresponding to the input power source voltage, and a rotation-reduction determining unit configured to acquire, based on a measured current value measured by the current measuring unit and a measured voltage value measured by the voltage measuring unit, a threshold of the input current associated with the measured voltage value, from the first storage unit, and to output information indicating reduction in a rotational speed of the cooling fan to the user interface unit when the measured current value exceeds the acquired threshold of the input current.

A second embodiment of a machine tool according to the present invention includes a cooling fan, a user interface unit configured to give a notice of a state of the machine tool, a current measuring unit configured to measure an input current to the cooling fan, a voltage measuring unit configured to measure an input power source voltage to the machine tool, a second storage unit storing a rotational speed reduction rate of the cooling fan associated with each combination of the input current and the input power source voltage, and a rotational speed estimating unit configured to estimate a rotational speed reduction rate of the cooling fan, based on a measured current value measured by the current measuring unit and a measured voltage value measured by the voltage measuring unit, and to output the estimated rotational speed reduction rate of the cooling fan to the user interface unit.

A first embodiment of a cooling device configured to cool a machine including a cooling fan according to the present invention includes a current measuring unit configured to measure an input current to the cooling fan, a voltage measuring unit configured to measure an input power source voltage to the cooling fan, a first storage unit storing a threshold of the input current corresponding to the input power source voltage, and a rotation-reduction determining unit configured to acquire, based on a measured current value measured by the current measuring unit and a measured voltage value measured by the voltage measuring unit, a threshold of the input current associated with the measured voltage value, from the first storage unit, and to output information indicating reduction in a rotational speed of the cooling fan when the measured current value exceeds the acquired threshold of the input current.

A second embodiment of a cooling device configured to cool a machine including a cooling fan according to the present invention includes a current measuring unit configured to measure an input current to the cooling fan, a voltage measuring unit configured to measure an input power source voltage to the cooling fan, a second storage unit storing a rotational speed reduction rate of the cooling fan associated with each combination of the input current and the input power source voltage, and a rotational speed estimating unit configured to estimate a rotational speed reduction rate of the cooling fan, based on a measured current value measured by the current measuring unit and a measured voltage value measured by the voltage measuring unit, and to output the estimated rotational speed reduction rate of the cooling fan.

According to an embodiment of the present invention, a machine tool that can detect the reduction in the rotational speed of a cooling fan based on the consumption current of the cooling fan even under fluctuation of a power source voltage applied to the cooling fan can be provided.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

A machine tool according to an embodiment of the present invention includes a cooling fan to which an input power to the machine tool is directly supplied, and monitors fluctuation of the power source voltage to the cooling fan and the consumption current of the cooling fan to detect the reduction in the rotational speed of the cooling fan.

Figure 1:
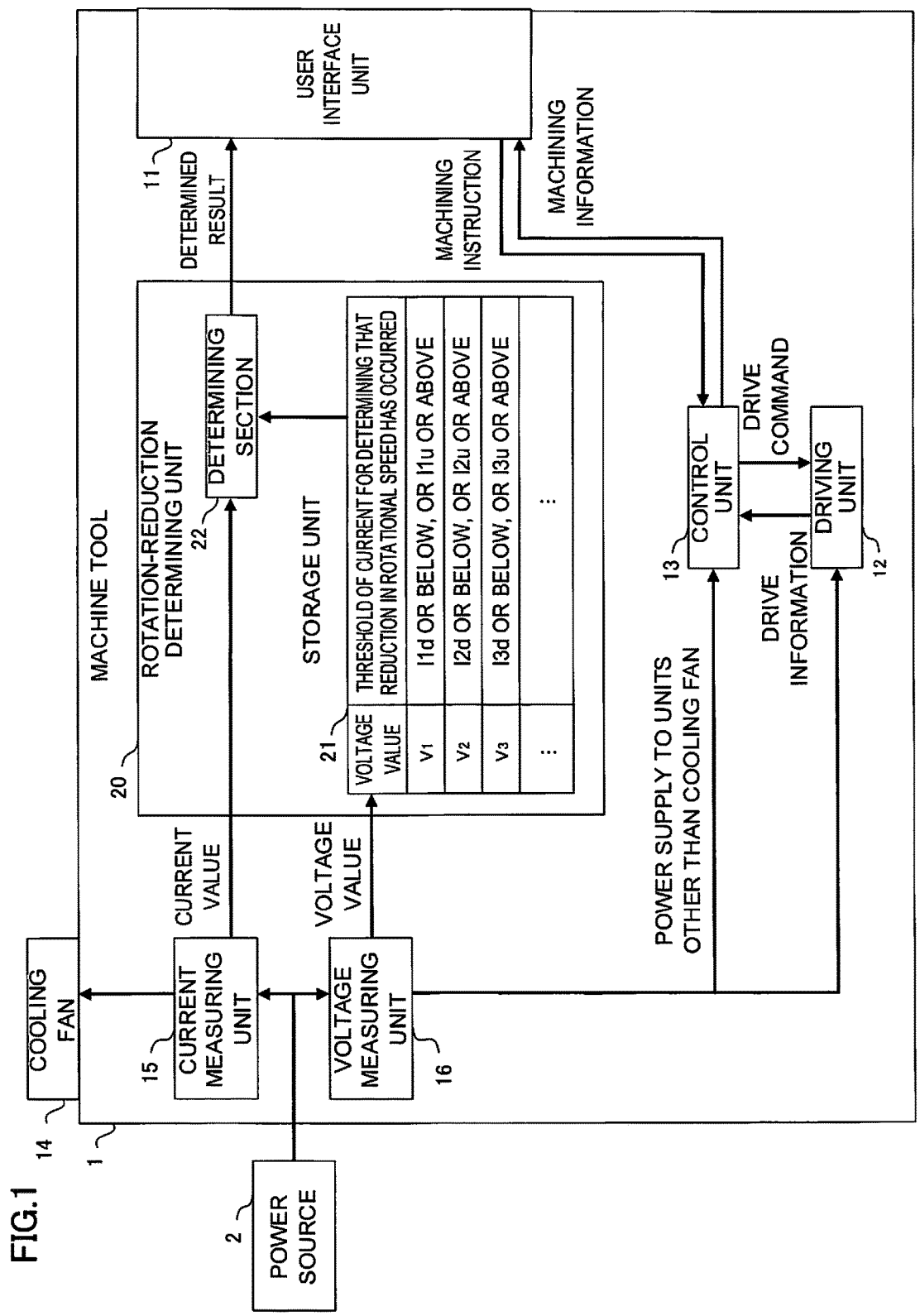
FIG. 1 is a block diagram of an essential portion of a machine tool according to a first embodiment of the present invention.
Figure 2:
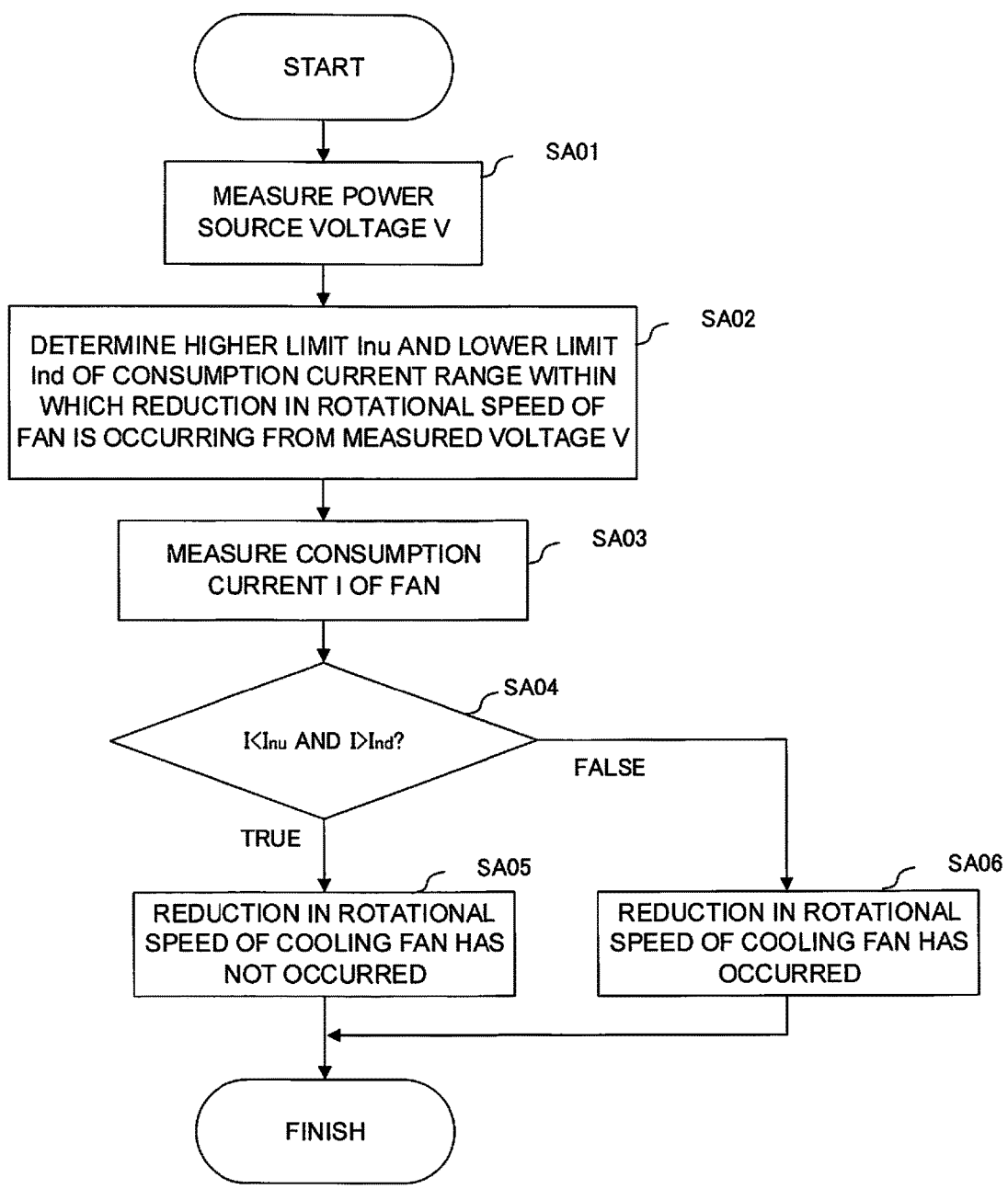
FIG. 2 is a flow chart illustrating an operation of the machine tool illustrated in FIG. 1.

A machine tool according to a first embodiment of the present invention will now be described referring to FIGS. 1 and 2.

A machine tool 1 includes a user interface unit 11, a machine tool driving unit 12, a machine tool control unit 13, a cooling fan 14, a current measuring unit 15, a voltage measuring unit 16, and a rotation-reduction determining unit 20.

The user interface unit 11 includes an input section configured with a key, a switch, a mouse, or a touch panel to receive an instruction from a user, a display section, such as a liquid crystal display, that provides machining information and various kinds of measurement information, an audio output section that outputs an alarm by a buzzer, and a lamp that presents information by light. A user can give an instruction through the input section to the machine tool control unit 13 via the user interface unit 11, and also check information on the machine tool through the display section.

The machine tool control unit 13 receives a machining instruction from a user through the user interface unit 11 or generates a machining instruction based on machining programs read from a memory (not shown). Based on the machining instruction, the machine tool control unit 13 controls the machine tool driving unit 12 to obtain machining information, and outputs the machining information to the user interface unit 11.

The cooling fan 14 cools the machine tool driving unit 12 and the machine tool control unit 13, which are heat sources. A voltage input to the machine tool 1 from the power source 2 is applied to the cooling fan 14.

The current measuring unit 15 measures a consumption current of the cooling fan 14. The voltage measuring unit 16 measures the voltage of the power source 2 that is applied to the cooling fan 14.

The rotation-reduction determining unit 20 includes a storage unit 21 and a determining section 22. The storage unit 21 stores a consumption current range within which the reduction in the rotational speed of the cooling fan 14 is not occurring. The storage unit 21 stores a plurality of voltage values $V_1$, $V_2$, $V_3$, . . . sorted in, for example, an ascending order. Each stored voltage value is associated with a consumption current range within which the reduction in the rotational speed of the cooling fan 14 is not occurring under application of the voltage value, as a range (threshold) of current value. The relationship between the voltage and the consumption current under a state where the reduction in the rotational speed of the cooling fan 14 is not occurring may previously be obtained by, for example, an experiment.

The storage unit 21 selects the consumption current range associated with the voltage value measured by the voltage measuring unit 16, and transmits the selected consumption current range to the determining section 22. If a value identical to the measured voltage value is not stored in the storage unit 21, for example, the consumption current range associated with a voltage value closest to the measured voltage value may be selected, or alternatively, the consumption current range associated with the largest of the stored voltage values that do not exceed the measured voltage value or the smallest of the stored voltage values that are not below the measured voltage value may be selected. Alternatively, based on values and ranges stored in the storage unit 21 that are the largest voltage value not exceeding the measured voltage value, the smallest voltage value not below the measured voltage value, and consumption current ranges respectively associated with the largest voltage value and the smallest voltage value, the consumption current range corresponding to the measured voltage value may be calculated using a known mathematical technique, such as linear interpolation.

The determining section 22 compares the consumption current range received from the storage unit 21 and the current value measured by the current measuring unit 15. If the measured current value is outside the consumption current range, the determining section 22 determines that the rotational speed of the cooling fan has decreased and transmits the determined result to the user interface unit 11.

An operation of the machine tool 1 according to the embodiment including such functional blocks will be described based on a flow chart illustrated in FIG. 2.

First, the voltage measuring unit 16 measures a voltage value $V_n$ of the power source (step SA01). The storage unit 21 then selects a consumption current range ($I_{nd}$ to $I_{nu}$) associated with the measured voltage value $V_n$ (step SA02). The current measuring unit 15 measures a consumption current value I (step SA03). The determining section 22 finally determines whether or not the measured consumption current value I is within a predetermined consumption current range (not equal to or smaller than the lower limit of consumption current, $I_{nd}$, nor equal to or higher than the higher limit of consumption current, $I_{nu}$) (step SA04). If the measured consumption current value I is not within the consumption current range (from $I_{nd}$ to $I_{nu}$), the determining section 22 determines that the rotational speed of the fan has decreased (step SA06).

A machine tool according to a second embodiment of the present invention will now be described referring to FIG. 3.

In contrast to the first embodiment, which determines whether the rotational speed of the cooling fan has decreased or has not decreased, the second embodiment notifies a user of the decreased level of the rotational speed from the normal rotational speed of the cooling fan.

Figure 3:
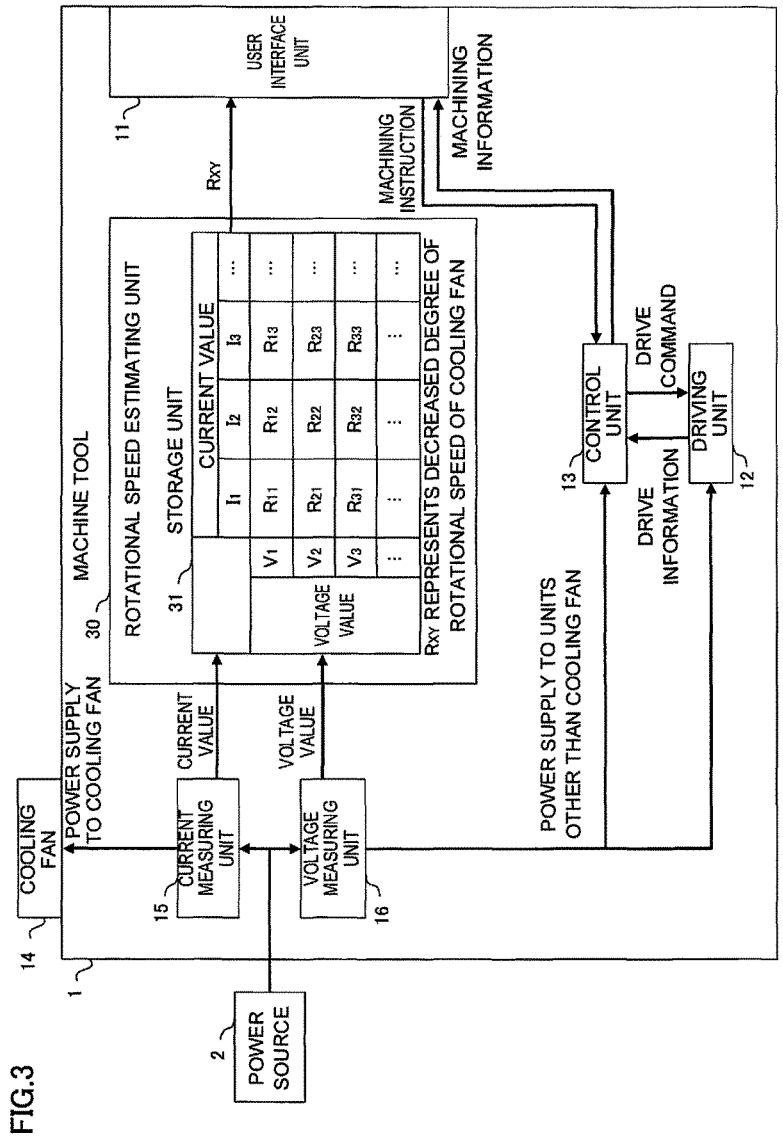
FIG. 3 is a block diagram of an essential portion of a machine tool according to a second embodiment of the present invention.

FIG. 3 is a block diagram of an essential portion of a machine tool according to the embodiment. A machine tool 1 according to the embodiment includes a rotational speed estimating unit 30 in place of the rotation-reduction determining unit 20 included in the machine tool 1 illustrated in FIG. 1 (the first embodiment).

The rotational speed estimating unit 30 includes a storage unit 31 that stores the rotational speed reduction rate of the cooling fan 14 associated with the consumption current of the cooling fan 14 and the power source voltage. The storage unit 31 stores a plurality of voltage values $V_1$, $V_2$, $V_3$, . . . and a plurality of current values $I_1$, $I_2$, $I_3$, . . . each sorted in, for example, an ascending order. For each combination of the voltage value $V_i$ and the current value $I_j$, the associated rotational speed reduction rate $R_{ij}$ is stored. $R_{ij}$ is the rotational speed reduction rate of the cooling fan 14 when the current value Ij is consumed under application of the voltage value Vi on the cooling fan 14. The relationship among the voltage, the current, and the rotational speed reduction rate of the cooling fan 14 may previously be obtained by, for example, an experiment.

The rotational speed reduction rate indicates the decreased level of the rotational speed from a normal state where the cooling fan 14 is rotating without any effect of contamination. The rotational speed reduction rate is expressed by percentages, for instance, 10% or 20%. The storage unit 31 stores the rotational speed reduction rate for each combination of the consumption current and the power source voltage. The storage unit 31 selects the reduction rate corresponding to the measured current value received from the current measuring unit 15 and the measured voltage value received from the voltage measuring unit 16, and transmits the selected reduction rate to the user interface unit 11.

The reduction rate corresponding to the measured current value received from the current measuring unit 15 and the measured voltage value received from the voltage measuring unit 16 may be selected in a similar manner to the first embodiment if values respectively identical to the measured current value and the measured voltage value are not stored. For example, the reduction rate associated with the stored current value and the stored voltage value respectively closest to the measured current value and the measured voltage value may be selected, or alternatively, the reduction rate associated with the largest of the stored current values and the largest of the stored voltage values that do not exceed the respective measured values, or the reduction rate associated with the smallest of the stored current values and the smallest of the stored voltage values that are not below the respective measured values may be selected. Alternatively, based on values and ranges stored in the storage unit 31 that are the largest values not exceeding the respective measured values, the smallest values not below the respective measured values, the reduction rate associated with the largest values, and the reduction rate associated with the smallest values, the reduction rate corresponding to the measured current value and the measured voltage value may be estimated using a known mathematical technique, such as linear interpolation.

The embodiments of the present invention are described above, not by way of limiting the scope of the present invention to these exemplary embodiments. The present invention can be worked in various manners by suitably modifying the above described embodiments.

Although the described embodiment is configured to detect the reduction in the rotational speed of the cooling fan included in the machine tool, the present invention can be applied, for example, to a cooling fan used in conventional machines. Furthermore, the cooling fan 14, the current measuring unit 15, the voltage measuring unit 16, and the rotation-reduction determining unit 20 may be configured as a unit.

The invention claimed is:

1. A machine tool including a cooling fan, the machine tool comprising:
   a user interface unit configured to give a notice of a state of the machine tool;
   a current measuring unit configured to measure an input current to the cooling fan;
   a voltage measuring unit configured to measure an input power source voltage to the machine tool;
   a first storage unit storing a threshold of the input current corresponding to the input power source voltage, the first storage unit storing a plurality of voltage values stored in an ascending order; and
   a rotation-reduction determining unit configured
      to acquire, based on a measured current value measured by the current measuring unit and a measured voltage value measured by the voltage measuring unit, a threshold of the input current associated with the measured voltage value, from the first storage unit, and
      to output information indicating reduction in a rotational speed of the cooling fan to the user interface unit when the measured current value exceeds the acquired threshold of the input current.

2. The machine tool according to claim 1, wherein the first storage unit further stores, as the threshold, a consumption current range within which the reduction in the rotational speed of the cooling fan is not occurring.

3. The machine tool according to claim 1, wherein
   each voltage value among the plurality of voltage values is associated with a consumption current range which is stored in the first storage unit as the threshold and within which the reduction in the rotational speed of the cooling fan is not occurring under application of the associated voltage value.

4. A machine tool including a cooling fan, the machine tool comprising:
   a user interface unit configured to give a notice of a state of the machine tool;
   a current measuring unit configured to measure an input current to the cooling fan;
   a voltage measuring unit configured to measure an input power source voltage to the machine tool;
   a second storage unit storing a rotational speed reduction rate of the cooling fan associated with each combination of the input current and the input power source voltage wherein
      the second storage unit stores
         a plurality of voltage values sorted in an ascending order, and a plurality of current values sorted in an ascending order;
a rotational speed estimating unit configured
to estimate a rotational speed reduction rate of the cooling fan, based on a measured current value measured by the current measuring unit and a measured voltage value measured by the voltage measuring unit, and
to output the estimated rotational speed reduction rate of the cooling fan to the user interface unit.

5. A cooling device configured to cool a machine including a cooling fan, the cooling device comprising:
a current measuring unit configured to measure an input current to the cooling fan;
a voltage measuring unit configured to measure an input power source voltage to the cooling fan;
a second storage unit storing a rotational speed reduction rate of the cooling fan associated with each combination of the input current and the input power source voltage, wherein
the second storage unit stores
a plurality of voltage values sorted in an ascending order,
a plurality of current values sorted in an ascending order;
a rotational speed estimating unit configured
to estimate a rotational speed reduction rate of the cooling fan, based on a measured current value measured by the current measuring unit and a measured voltage value measured by the voltage measuring unit, and
to output the estimated rotational speed reduction rate of the cooling fan.

6. A cooling device configured to cool a machine including a cooling fan, the cooling device comprising:
a current measuring unit configured to measure an input current to the cooling fan;
a voltage measuring unit configured to measure an input power source voltage to the cooling fan;
a first storage unit storing a threshold of the input current corresponding to the input power source voltage, the first storing unit storing a plurality of voltage values stored in an ascending order; and
a rotation-reduction determining unit configured
to acquire, based on a measured current value measured by the current measuring unit and a measured voltage value measured by the voltage measuring unit, a threshold of the input current associated with the measured voltage value, from the first storage unit, and
to output information indicating reduction in a rotational speed of the cooling fan when the measured current value exceeds the acquired threshold of the input current.

7. The cooling device according to claim 6, wherein the first storage unit further stores, as the threshold, a consumption current range within which the reduction in the rotational speed of the cooling fan is not occurring.

8. The cooling device according to claim 6, wherein
each voltage value among the plurality of voltage values is associated with a consumption current range which is stored in the first storage unit as the threshold and within which the reduction in the rotational speed of the cooling fan is not occurring under application of the associated voltage value.

9. The machine tool according to claim 4, wherein
for each combination of a voltage value among the plurality of voltage values and a current value among the plurality of current values, the second storage unit stores the associated rotational speed reduction rate of the cooling fan when the current value is consumed under application of the voltage value on the cooling fan.

10. The cooling device according to claim 9, wherein
for each combination of a voltage value among the plurality of voltage values and a current value among the plurality of current values, the second storage unit stores the associated rotational speed reduction rate of the cooling fan when the current value is consumed under application of the voltage value on the cooling fan.

* * * * *